(12) United States Patent
List (10) Patent No.: US 11,760,393 B2
(45) Date of Patent: Sep. 19, 2023

(54) GASKET FOR HATCH COVER ASSEMBLY OF A RAIL CAR

(71) Applicant: Amsted Rail Company, Inc., Chicago, IL (US)

(72) Inventor: Michael List, Catlin, IL (US)

(73) Assignee: Amsted Rail Company, Inc., Chicago, IL (US)

( * ) Notice: Subject to any disclaimer, the term of this patent is extended or adjusted under 35 U.S.C. 154(b) by 570 days.

(21) Appl. No.: 16/936,560

(22) Filed: Jul. 23, 2020

(65) Prior Publication Data

US 2021/0039687 A1 Feb. 11, 2021

Related U.S. Application Data (60) Provisional application No. 62/882,624, filed on Aug. 5, 2019.

(51) Int. Cl.
| | | |
|---|---|---|
| *B61D 17/16* | (2006.01) |
| *B60J 10/27* | (2016.01) |
| *B65D 90/00* | (2006.01) |
| *B65D 90/10* | (2006.01) |
| *F16J 15/00* | (2006.01) |
| *F16J 15/02* | (2006.01) |
| *B61D 7/00* | (2006.01) |

(52) U.S. Cl.
CPC ............. *B61D 17/16* (2013.01); *B60J 10/27* (2016.02); *B61D 5/08* (2013.01); *B61D 7/00* (2013.01); *B65D 90/10* (2013.01); *F16J 15/00* (2013.01); *F16J 15/025* (2013.01)

(58) Field of Classification Search
CPC . B61D 17/16; B61D 5/08; B61D 90/10; B60J 10/27; F16J 15/00; F16J 15/025
USPC .................................................... 105/377.07
See application file for complete search history.

(56) References Cited

U.S. PATENT DOCUMENTS

| | | | | |
|---|---|---|---|---|
| 3,126,591 A | * | 3/1964 | Hamilton | E06B 7/2318 |
| | | | | 105/377.08 |
| 4,387,900 A | * | 6/1983 | Ditcher | F16L 5/10 |
| | | | | 277/606 |
| 5,064,089 A | | 11/1991 | Schultz | |
| 6,494,338 B1 | * | 12/2002 | Schultz | B65D 90/10 |
| | | | | 220/221 |
| 7,469,905 B2 | * | 12/2008 | Knapp | F16L 17/025 |
| | | | | 277/609 |

(Continued)

FOREIGN PATENT DOCUMENTS

CN 102272493 A * 12/2011 ............. F16J 15/025

OTHER PUBLICATIONS

Notification of Transmittal of the International Search Report and the Written Opinion of the International Searching Authority for PCT/US2020/043173, dated Oct. 9, 2020.

*Primary Examiner* — Zachary L Kuhfuss
*Assistant Examiner* — James William Jones
(74) *Attorney, Agent, or Firm* — The Small Patent Law Group LLC; Joseph M. Butscher (57) ABSTRACT

A hatch cover assembly for a rail car includes a gasket including a sealing wedge extending downwardly from a lower surface of the gasket. The sealing wedge is configured to sealingly engage a lip of a hatch ring. The hatch cover further includes a gasket retainer having one or more channels. The gasket further includes one or more upwardly-extending annular ribs retained within the one or more channels of the gasket retainer.

20 Claims, 8 Drawing Sheets

(56) References Cited

U.S. PATENT DOCUMENTS

| | | | | |
|---|---|---|---|---|
| 8,056,486 B2* | 11/2011 | Haymond | ............... | B61D 39/00 |
| | | | | 105/377.07 |
| 8,727,387 B2* | 5/2014 | Knapp | ................ | F16L 27/1136 |
| | | | | 285/236 |
| 10,046,516 B2* | 8/2018 | Knapp | .................... | B29C 48/12 |
| 10,359,137 B1* | 7/2019 | Keil | ........................ | F16L 21/03 |
| 11,548,536 B1* | 1/2023 | Anderson | ................ | B61D 5/08 |
| 2008/0127854 A1* | 6/2008 | Forbes | .................... | B61D 7/00 |
| | | | | 105/247 |
| 2008/0303224 A1* | 12/2008 | Knapp | ................... | F16J 15/061 |
| | | | | 277/627 |
| 2009/0158959 A1* | 6/2009 | Schultz | ................. | B61D 17/16 |
| | | | | 105/377.07 |
| 2010/0282124 A1* | 11/2010 | Blevins, Jr. | ............. | B61D 5/08 |
| | | | | 105/377.08 |
| 2012/0125823 A1* | 5/2012 | Smith | ...................... | B07B 1/38 |
| | | | | 209/363 |
| 2014/0345493 A1* | 11/2014 | Skibinski | ............. | B61D 39/008 |
| | | | | 105/377.08 |
| 2019/0040616 A1* | 2/2019 | Coronado | ................ | F16J 15/00 |
| 2019/0112867 A1 | 4/2019 | Warren | | |

* cited by examiner

GASKET FOR HATCH COVER ASSEMBLY OF A RAIL CAR

RELATED APPLICATIONS

This application relates to and claims priority benefits from U.S. Provisional Patent Application No. 62/882,624, filed Aug. 5, 2019, which is hereby incorporated by reference in its entirety.

FIELD OF THE DISCLOSURE

Embodiments of the present disclosure generally relate to hatch cover assemblies of rail vehicles, such as rail cars, and, more particularly, to gaskets for hatch cover assemblies of rail vehicles.

BACKGROUND OF THE DISCLOSURE

Rail vehicles travel along railways, which have tracks that include rails. A rail vehicle includes one or more truck assemblies that support one or more car bodies. Certain rail vehicles include one or more hatch cover assemblies on an upper surface of a car body.

In order to control moisture and debris from infiltrating into a car body, hatch cover assemblies typically include a gasket. The gasket provides a sealing interface with a portion of the hatch cover assembly.

The gasket generally includes a flat lower surface that seats on a hatch ring. Further, the hatch cover assembly includes a hinge and a latch. When the hatch cover assembly is closed, the hinge and the latch provide clamping force that ensures a secure, sealing engagement between the gasket and the hatch ring proximate to the hinge and the latch.

However, at areas radially away from the hinge and the latch, the gasket may warp, buckle, or deflect due to the forces exerted at the areas of the hinge and the latch. Consequently, gaps may form between the gasket and the hatch ring at areas that are away from the hinge and the latch. The gaps provide paths for debris and moisture to pass.

SUMMARY OF THE DISCLOSURE

A need exists for a gasket for a hatch cover assembly that provides a uniform and reliable seal around a circumference of hatch ring. With that need in mind, certain embodiments of the present disclosure provide a hatch cover assembly for a rail car. The hatch cover assembly includes a gasket including a sealing wedge extending downwardly from a lower surface of the gasket. The sealing wedge is configured to sealingly engage a lip of a hatch ring.

The hatch cover assembly may also include a cover having a hinge and a latch. The hatch cover assembly may also include the hatch ring, and a gasket retainer coupled to the gasket.

In at least one embodiment, the gasket further includes a first annular rib extending upwardly from an upper surface a main body around a central base, a second annular rib outboard from the first annular rib, a third annular rib outboard from the second annular rib, and an outer annular rim outboard from the third annular rim. The central base may be contiguous without any spaces or gaps formed between an upper surface and an opposite lower surface. Optionally, the central base may include a mesh having a plurality of fluid passages.

In at least one embodiment, the sealing wedge includes an arcuate inner wall that downwardly and outwardly curves from the lower surface, and an arcuate outer wall that connects to the inner wall at an annular apex. In at least one embodiment, the sealing wedge also includes an interior divot formed into an upper surface of the gasket above the apex.

The sealing wedge sealingly engages an interior surface of the lip of the hatch ring. The sealing wedge may also sealingly engage a top surface of the lip of the hatch ring.

Certain embodiments of the present disclosure provide a sealing method for a hatch cover assembly. The sealing method includes forming a sealing wedge to extend downwardly from a lower surface of a gasket, and sealingly engaging a lip of a hatch ring of the hatch cover assembly with the sealing wedge. The sealing method may also include coupling the gasket to a gasket retainer.

In at least one embodiment, said forming includes providing an arcuate inner wall that downwardly and outwardly curves from the lower surface, and connecting an arcuate outer wall to the inner wall at an annular apex. Said forming may also include forming an interior divot into an upper surface of the gasket above the apex.

In at least one embodiment, said sealingly engaging includes sealingly engaging an interior surface of the lip of the hatch ring. Said sealingly engaging may also include sealingly engaging a top surface of the lip of the hatch ring.

Certain embodiments of the present disclosure provide a rail car including one or more truck assemblies including wheel sets that are configured to be rotatably supported on rails. A car body is supported by the truck assemblies. The car body includes at least one compartment. A hatch cover assembly is mounted on the car body. The hatch cover assembly includes a gasket including a sealing wedge extending downwardly from a lower surface of the gasket. The sealing wedge is configured to sealingly engage a lip of a hatch ring.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a gasket for a hatch cover assembly. The gasket includes an annular sealing wedge that extends circumferentially around a portion of the gasket. The sealing wedge downwardly extends from a lower surface of the gasket. The lower surface of the gasket is not entirely flat.

Embodiments of the present disclosure provide a hatch cover assembly for a rail car. The hatch cover assembly includes a gasket including a sealing wedge extending downwardly from a lower surface of the gasket. The sealing wedge is configured to sealingly engage a lip of a hatch ring.

Figure 1:
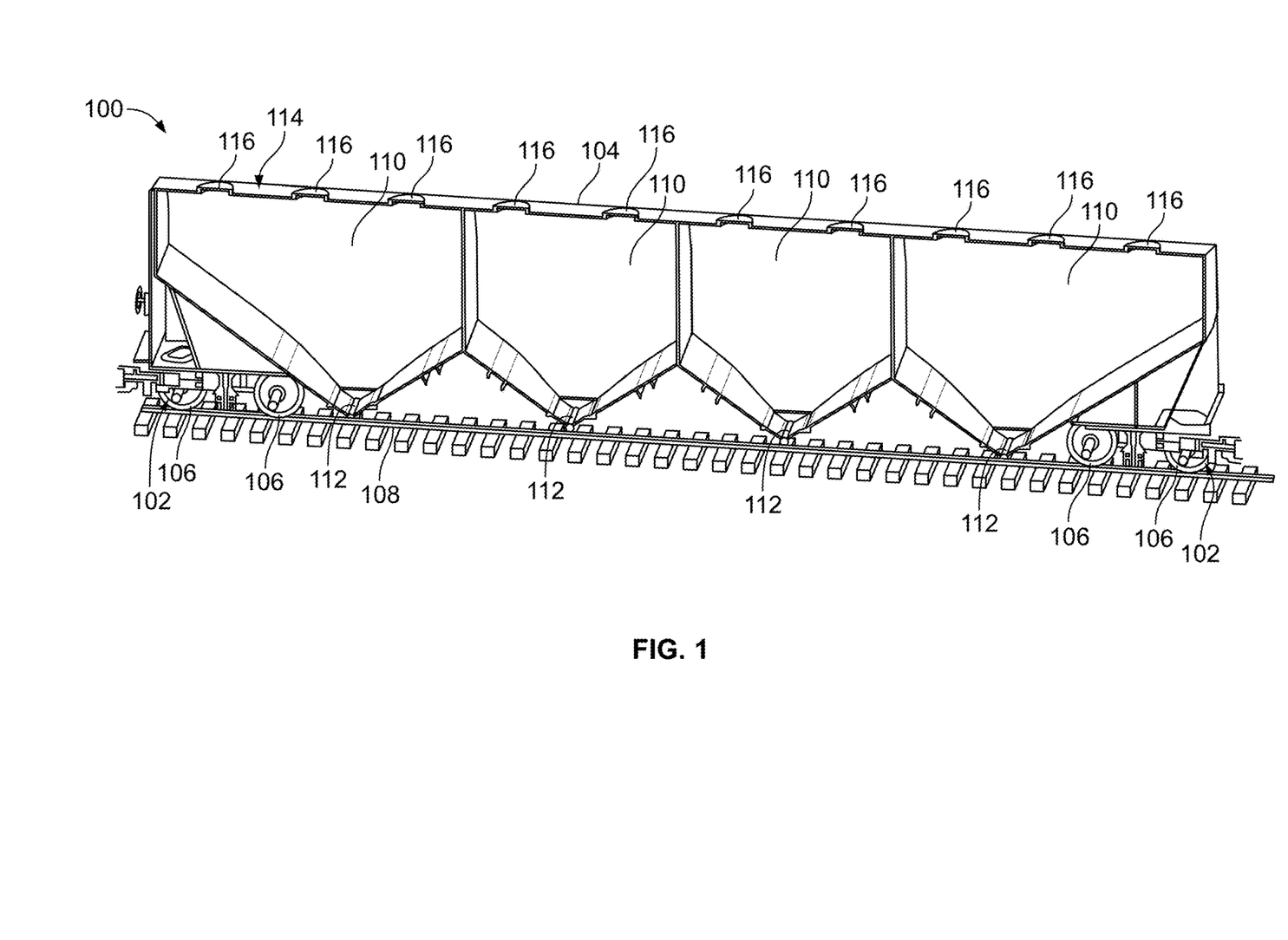
FIG. 1 illustrates a perspective transverse cross-sectional view of a rail car, according to an embodiment of the present disclosure.

FIG. 1 illustrates a perspective transverse cross-sectional view of a rail car 100, according to an embodiment of the present disclosure. The rail car 100 includes truck assemblies 102 that support a car body 104. Each truck assembly 102 includes wheel sets 106 that are rotatably supported on rails 108.

In at least one embodiment, the car body 104 includes a plurality of compartments 110. The compartments 110 are configured to carry and retain components, such as plastic pellets. A lower portion of each compartment 110 includes a moveable gate 112 that is configured to be moved between a closed position and an open position. In the open position, contents within the compartments 110 pass out of the compartments 110.

The car body 104 also includes a top wall 114. Hatch cover assemblies 116 are mounted over openings formed in the top wall 114. Each compartment 110 may include at least one vented hatch cover assembly 116 and at least one non-vented hatch cover assembly 116.

The rail car 100 may include more or less truck assemblies 102 than shown. Further, the rail car 100 may include more or less compartments 110 than shown. Additionally, the rail car 100 may include more or less gates 112 than shown. In at least one embodiment, the rail car 100 may not include any gates.

Figure 2:
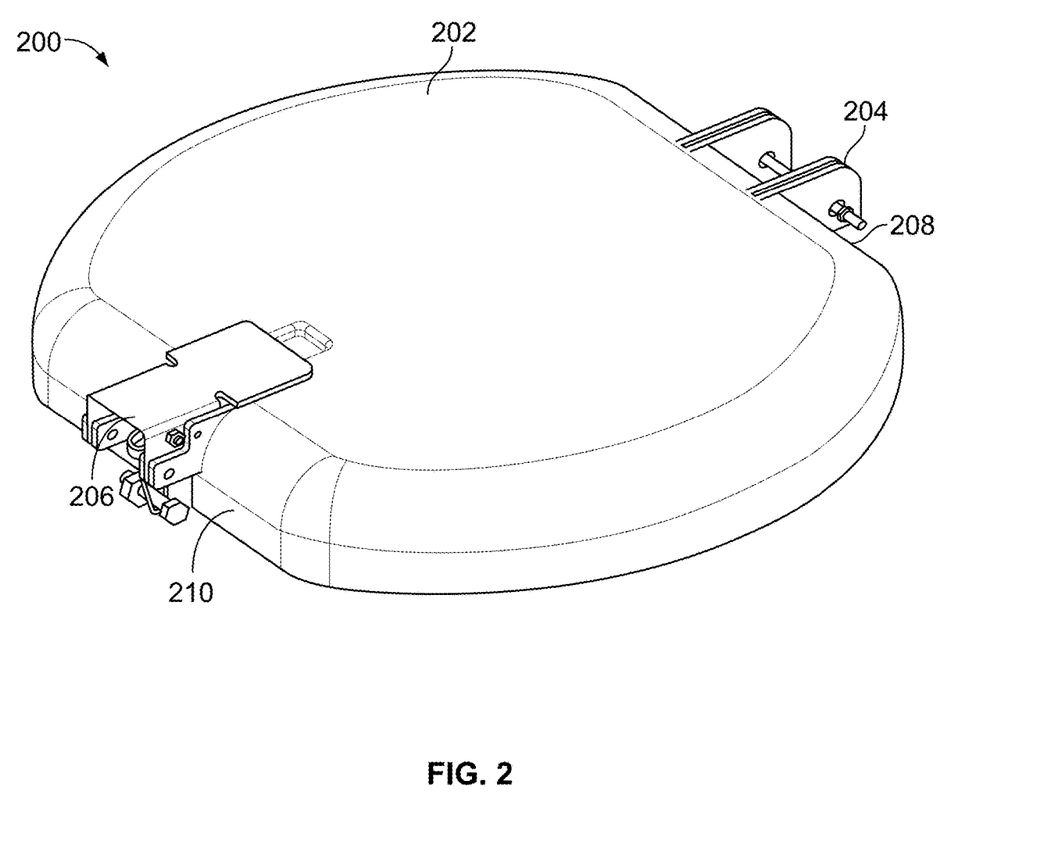
FIG. 2 illustrates a perspective top view of a hatch cover assembly, according to an embodiment of the present disclosure.

FIG. 2 illustrates a perspective top view of a hatch cover assembly 200, according to an embodiment of the present disclosure. The hatch cover assemblies 116 shown in FIG. 1 are configured as the hatch cover assembly 200.

The hatch cover assembly 200 includes a cover 202 having a hinge 204 and a latch 206. The hinge 204 is configured to pivotally couple to a reciprocal structure on a hatch ring. The latch 206 is configured to latchably engage a latch member on the hatch ring to securely close the hatch cover assembly 200.

The hinge 204 may be at a first or rear end 208 of the hatch cover assembly 200, while the latch 206 is at a second or front end 210 of the hatch cover assembly 200. The rear end 208 is opposite from the front end 210. As shown, the hinge 204 may be generally 180 radially degrees from the latch 206.

Figure 3:
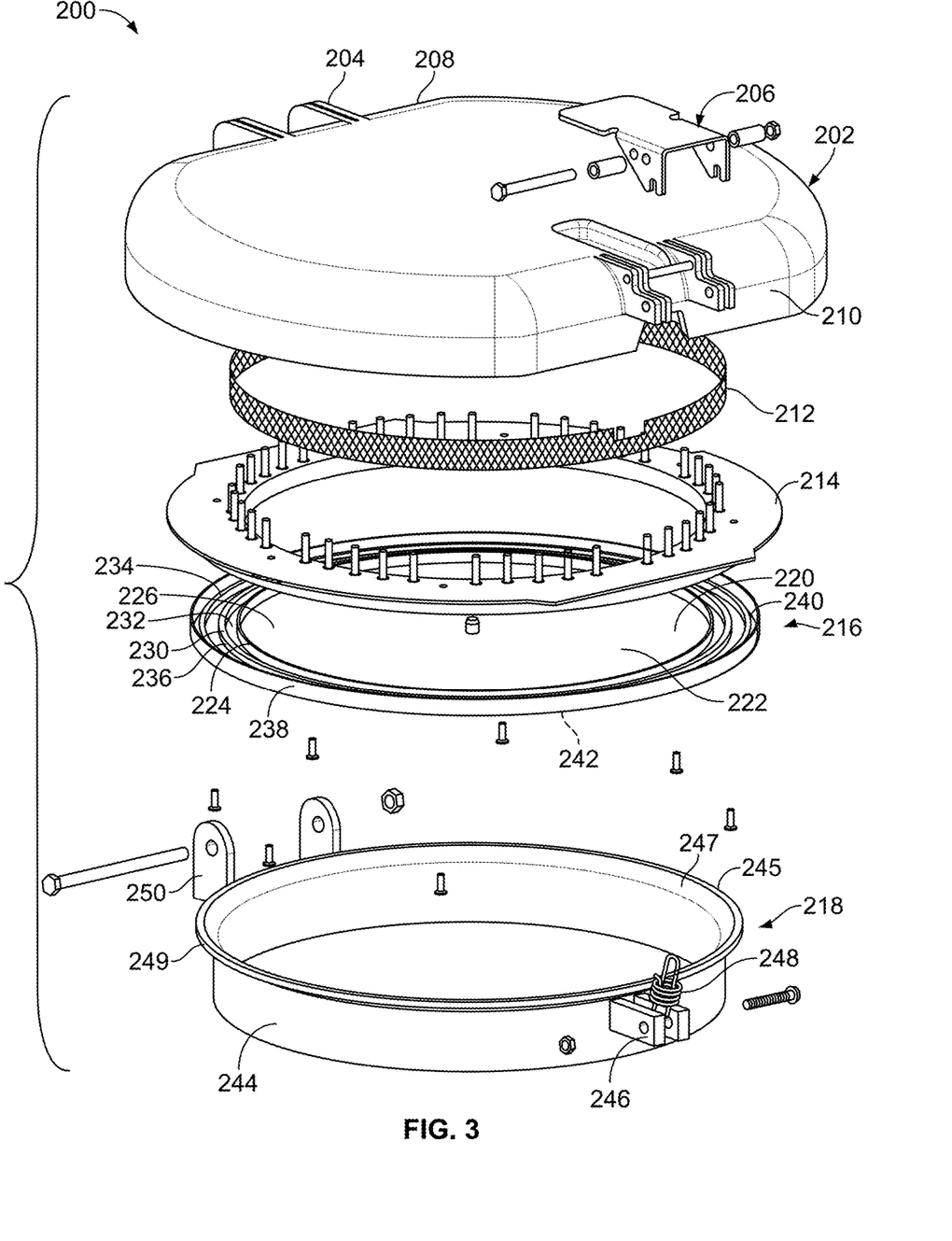
FIG. 3 illustrates a perspective exploded view of the hatch cover assembly, according to an embodiment of the present disclosure.

FIG. 3 illustrates a perspective exploded view of the hatch cover assembly 200. The hatch cover assembly 200 include the cover 202, an annular screen 212, a gasket retainer 214, a gasket 216, and a hatch coaming or ring 218.

The gasket 216 includes a main body 220 including a central base 222. A first annular rib 224 extends upwardly from an upper surface 226 of the main body 220 around the central base 222. A second annular rib 230 is outboard from the first annular rib 224 and extends upwardly from the upper surface 226. The second annular rib 230 is separated from the first annular rib 224 by a first annular space 232. A third annular rib 234 is outboard from the second annular rib 230 and extends upwardly from the upper surface 226. The third annular rib 234 is separated from the second annular rib 230 by a second annular space 236. An outer annular rim 238 is outboard from the third annular rib 234 and extends upwardly from the upper surface 226. The outer annular rim 238 is separated from the third annular rib 234 by a third annular space 240.

As shown, the central base 222 may be contiguous without any spaces or gaps formed between the upper surface 226 and an opposite lower surface 242. As such, the gasket 216 is non-vented. Optionally, the central base 222 may include a plurality of passages formed therethrough. For example, the central base 222 may be formed as a mesh or screen. As such, the central base 222 may be vented.

In at least one embodiment, the gasket 216 may include more or less annular ribs than shown. For example, the gasket 216 may not include any of the inboard annular ribs.

The gasket 216 may be formed of an elastomeric material. For example, the gasket 216 may be formed of santoprene or rubber. In at least one other embodiment, the gasket 216 may be formed of a plastic. In at least one other embodiment, the gasket 216 may be formed of a metal. The gasket 216 is configured to sealingly engage the hatch ring 218. As explained herein, the gasket 216 sealingly engages around a circumference of the hatch ring 218 to provide a reliable, uniform seal therewith.

The hatch ring 218 includes an upstanding annular sleeve 244. A circumferential lip 245 outwardly turns from the sleeve 244. A latch coupling 246 having a spring 248 extends from the sleeve 244. The latch coupling 246 is configured to latchably engage the latch 206. A hinge coupling 250 extends from the sleeve 244 opposite from the latch coupling 246. The hinge coupling 250 is configured to pivotally engage the hinge 204.

The gasket 216 seats over the sleeve 244 on the lip 245. The gasket 216 provides a uniform and reliable seal around a circumference of the lip 245.

Figure 4:
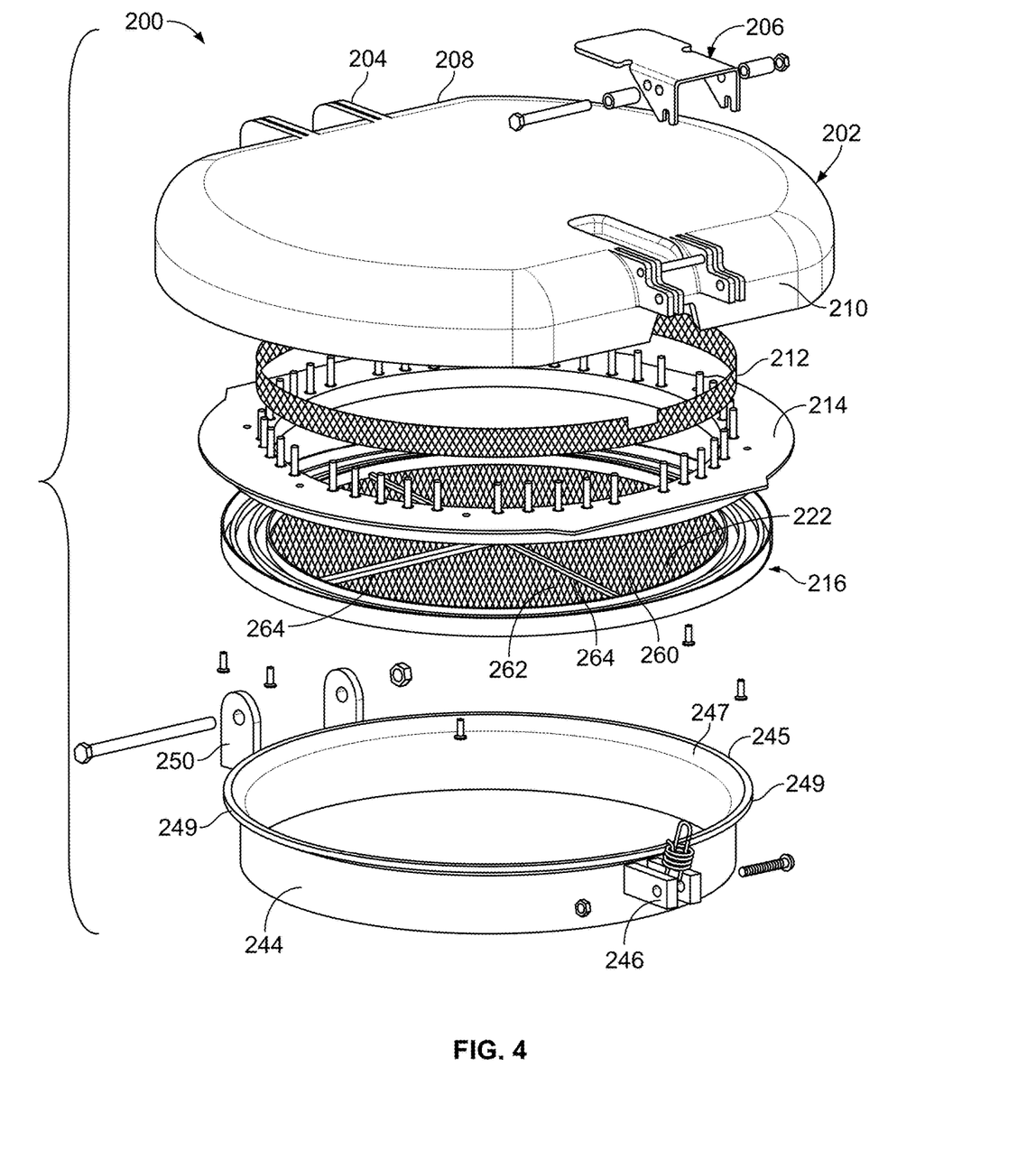
FIG. 4 illustrates a perspective exploded view of the hatch cover assembly, according to an embodiment of the present disclosure.

FIG. 4 illustrates a perspective exploded view of the hatch cover assembly 200, according to an embodiment of the present disclosure. In this embodiment, the central base 222 includes a screen or mesh 260 having a plurality of fluid passages 262. As such, the gasket 216 is vented. One or more support cross beams 264 may extend over and/or through the mesh 260.

Figure 5:
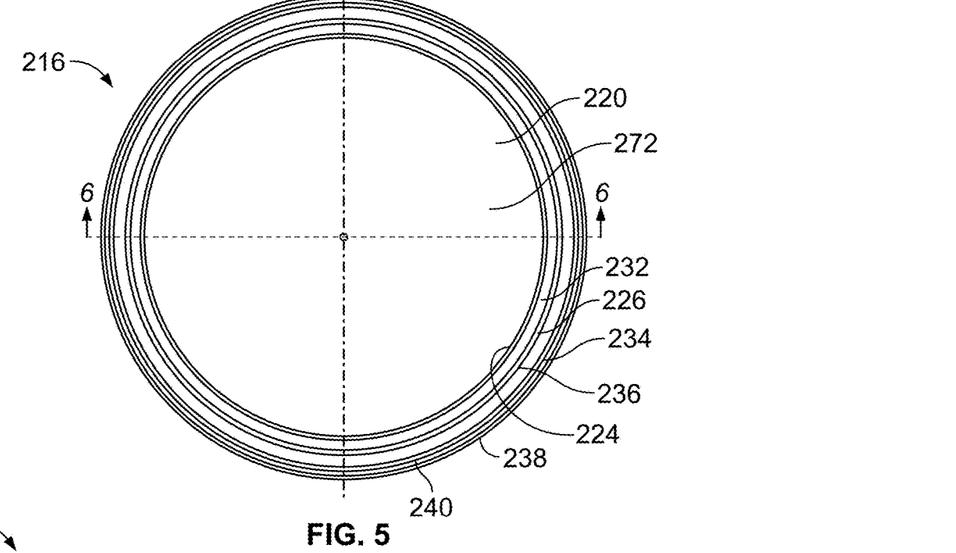
FIG. 5 illustrates a top view of a gasket, according to an embodiment of the present disclosure.
Figure 6:
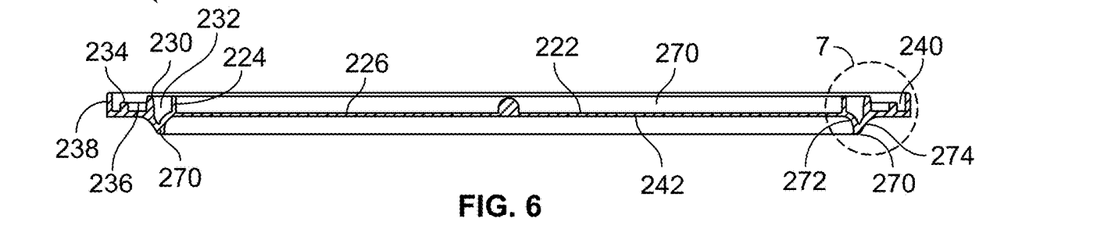
FIG. 6 illustrates a cross-sectional view of the gasket through line 6-6 of FIG. 5.
Figure 7:
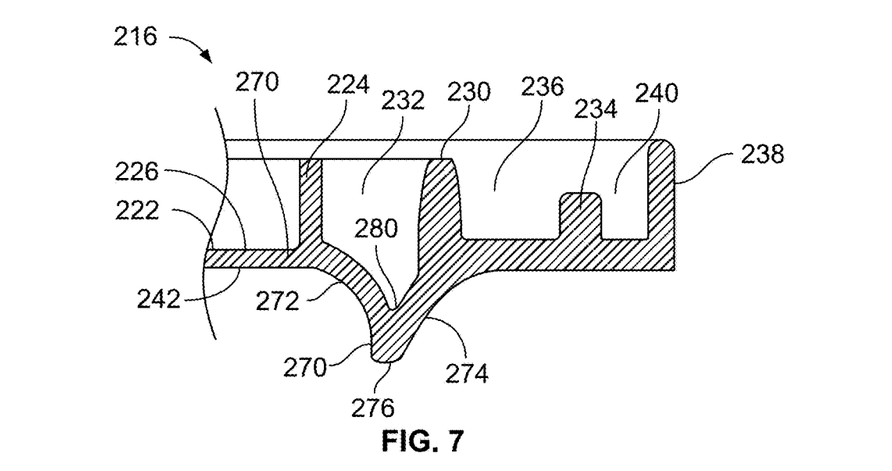
FIG. 7 illustrates a cross-sectional view of a sealing wedge of the gasket from detail 7 of FIG. 6.

FIG. 5 illustrates a top view of the gasket 216. FIG. 6 illustrates a cross-sectional view of the gasket 216 through line 6-6 of FIG. 5. FIG. 7 illustrates a cross-sectional view of the sealing wedge 270 of the gasket from detail 7 of FIG. 6.

Referring to FIGS. 5-7, the first annular rib 224 extends upwardly from the upper surface 226 of the main body 220 around the central base 222. The second annular rib 230 is outboard from the first annular rib 224 and extends upwardly from the upper surface 226. The second annular rib 230 is separated from the first annular rib 224 by the first annular space 232. The third annular rib 234 is outboard from the second annular rib 230 and extends upwardly from the upper surface 226. The third annular rib 234 is separated from the second annular rib 230 by the second annular space 236. The outer annular rim 238 is outboard from the third annular rib 234 and extends upwardly from the upper surface 226. The outer annular rim 238 is separated from the third annular rib 234 by the third annular space 240.

The sealing wedge 270 downwardly extends from the lower surface 242 of the main body 220. The sealing wedge 270 circumferentially extends around an interior portion of the gasket 216. The sealing wedge 270 includes an arcuate inner wall 272 that downwardly and outwardly curves from the lower surface 242 between the first annular rib 224 and the second annular rib 230. The sealing wedge 270 also includes an arcuate outer wall 274 that connects to the inner wall 272 at an annular apex 276. The outer wall 274 also extends from the lower surface 242 underneath the second annular rib 230. As shown, the apex 276 may be underneath the first annular space 232. An interior divot 280 may extend into the upper surface 226 above the apex 276. The divot 280 provides increased flexibility to the sealing wedge 270, thereby allowing increased ability to conform to the lip 245 of the hatch ring 218 (shown in FIGS. 3 and 4). Alternatively, the sealing wedge 270 may not include the divot 280.

Referring to FIGS. 3-7, the sealing wedge 270 downwardly extends from the gasket 216 and is configured to sealingly engage an interior surface of the lip 245. The engagement between the sealing wedge 270 and the interior surface of the lip provides a primary sealing interface therebetween. The curvature of the inner wall 272 of the sealing wedge 270 is configured to sealingly engage an interior surface 247 of the lip 245. For example, the inner wall 272 proximate the apex 276 sealingly engages the inner surface 247 of the lip 245.

The sealing wedge 270 may also provide a sealing engagement with a top surface 249 of the lip 245. For example, the inner wall 272 proximate to the first annular rib 224 sealingly engages the top surface 249 of the lip 245.

Figure 8:
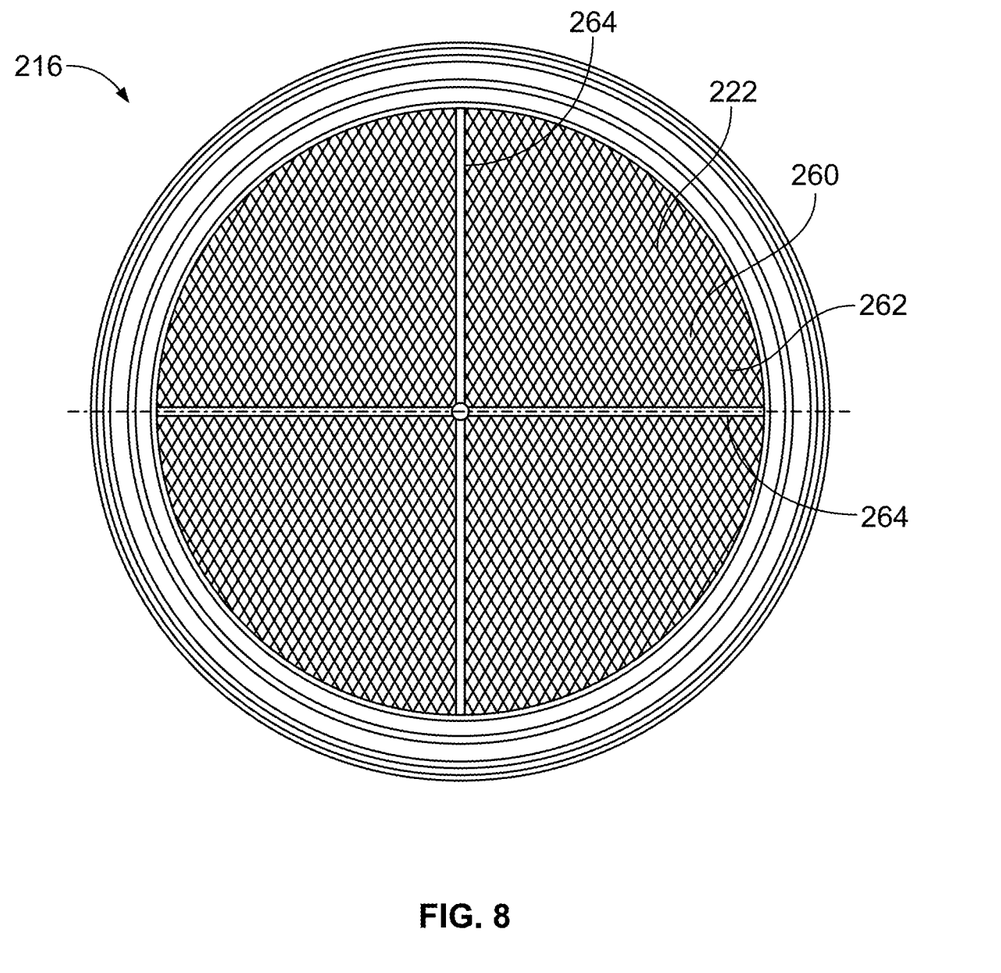
FIG. 8 illustrates a top view the gasket, according to an embodiment of the present disclosure.

FIG. 8 illustrates a top view the gasket 216, according to an embodiment of the present disclosure. The gasket 216 shown in FIG. 8 is the same as the gasket 216 shown in FIGS. 5-7, except that the central base 222 includes the screen or mesh 260 having the fluid passages 262. As such, the gasket 216 may be vented.

Figure 9:
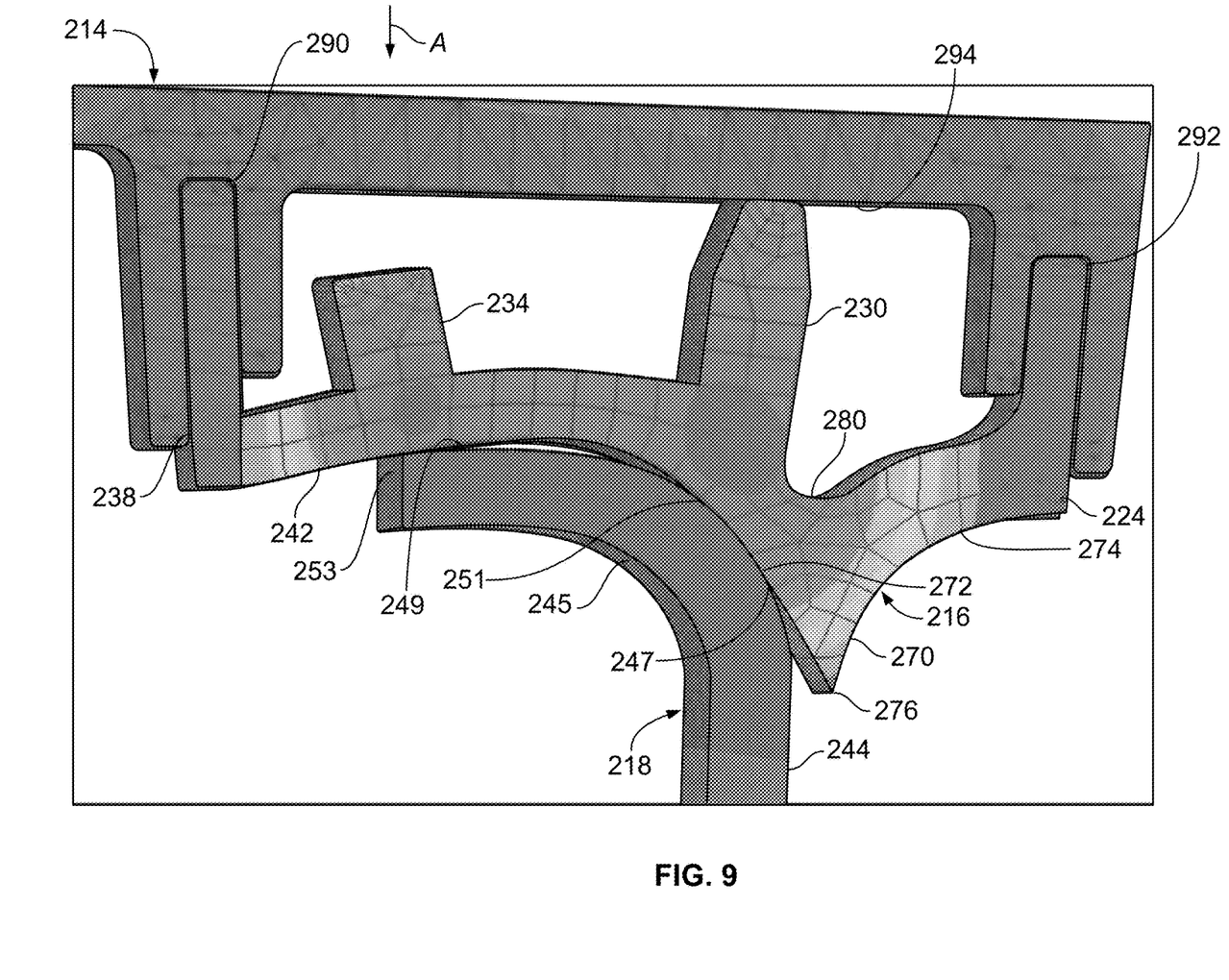
FIG. 9 illustrates a cross-sectional view of the gasket coupled to a hatch cover and a gasket retainer, according to an embodiment of the present disclosure.

FIG. 9 illustrates a cross-sectional view of the gasket 216 coupled to the hatch cover 202 and the gasket retainer 214, according to an embodiment of the present disclosure. The annular rim 238 may be retained within an outboard channel 290 of the gasket retainer 214. The first annular rib 224 may be retained within an inboard channel 292 of the gasket retainer 214. The second annular rib 230 may abut into a lower surface 294 of the gasket retainer 214.

As shown, the sealing wedge 270 provides a primary sealing engagement with an interior surface 251 of the lip 245 of the hatch ring 218. As force in the direction of arrow A is exerted into the gasket 216 proximate to an outer edge 253 of the hatch ring 218, the gasket 216 deflects such that the inner wall 272 is forced towards the lip 245, thereby maintaining a secure, sealing interface therewith. Further, the outer portions of the gasket 216, such as underneath the third annular rib 234, may be forced into the top surface 249 proximate to the outer edge 253, thereby providing a secondary sealing interface. In general, as force is exerted in the direction of arrow A, the sealing wedge 270 is leveraged into a primary sealing interface between the inner wall 272 and the interior surface 247 of the lip 245, and a secondary sealing interface between the gasket 216 and the top surface 249 of the lip 245. As such, the gasket 216 provides sealing redundancy (at the two different sealing interfaces).

The sealing wedge 270 extending downwardly from the gasket 216 provides a uniform, reliable seal with the hatch ring 218. That is, instead of having a flat lower surface, the gasket 216 includes the downwardly-directed sealing wedge 270, which ensures contiguous sealing engagement around a circumference of the hatch ring 218 (for example, around a circumference of the interior surface 247 of the lip 245). As such, the sealing wedge 270 prevents, minimizes, or otherwise reduces the potential for pathways for infiltration of moisture and/or debris.

Figure 10:
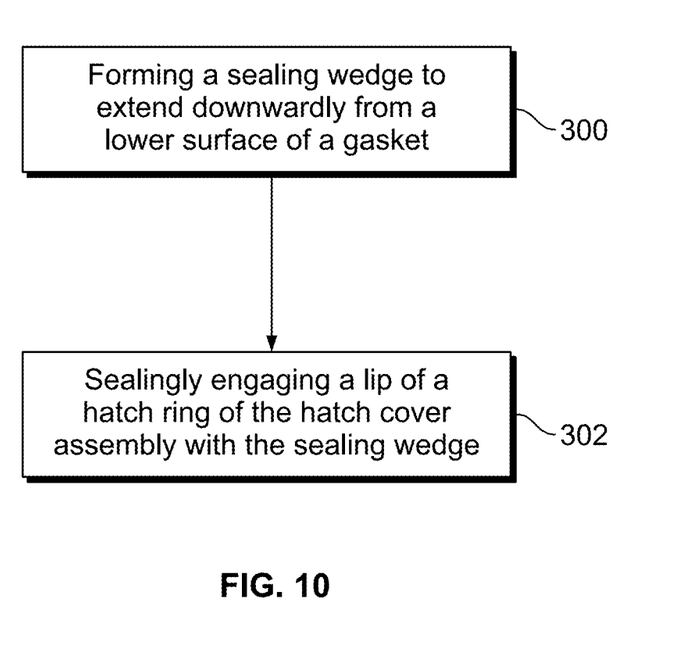
FIG. 10 illustrates a flow chart of a sealing method for a hatch cover assembly of a rail car, according to an embodiment of the present disclosure.

FIG. 10 illustrates a flow chart of a sealing method for a hatch cover assembly of a rail car, according to an embodiment of the present disclosure. The sealing method includes forming (300) a sealing wedge to extend downwardly from a lower surface of a gasket, and sealingly engaging (302) a lip of a hatch ring of the hatch cover assembly with the sealing wedge. The sealing method may also include coupling the gasket to a gasket retainer.

In at least one embodiment, the forming includes providing an arcuate inner wall that downwardly and outwardly curves from the lower surface, and connecting an arcuate outer wall to the inner wall at an annular apex. The forming may also include forming an interior divot into an upper surface of the gasket above the apex.

In at least one embodiment, the sealingly engaging includes sealingly engaging an interior surface of the lip of the hatch ring. The sealingly engaging may also include sealingly engaging a top surface of the lip of the hatch ring.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A hatch cover assembly for a rail car, the hatch cover assembly comprising:
   a gasket retainer having one or more channels;
   a gasket including:
      a sealing wedge extending downwardly from a lower surface of the gasket, wherein the sealing wedge includes an annular pointed lower edge, and wherein the sealing wedge is configured to sealingly engage a lip of a hatch ring; and
      one or more upwardly-extending annular ribs retained within the one or more channels of the gasket retainer.

2. The hatch cover assembly of claim 1, further comprising a cover having a hinge and a latch.

3. The hatch cover assembly of claim 1, further comprising the hatch ring.

4. The hatch cover assembly of claim 1, wherein the one or more upwardly-extending annular ribs comprises a first annular rib extending upwardly from an upper surface of a main body around a central base, wherein the first annular rib is retained within an inboard channel of the gasket retainer, wherein the gasket further comprises:
   a second annular rib outboard from the first annular rib, wherein the second annular rib abuts into a lower surface of the gasket retainer;
   a third annular rib outboard from the second annular rib; and
   an outer annular rim outboard from the third annular rib, wherein the outer annular rim is retained within an outboard channel of the gasket retainer.

5. The hatch cover assembly of claim 4, wherein the central base is contiguous without any spaces or gaps formed between an upper surface and an opposite lower surface.

6. The hatch cover assembly of claim 4, wherein the central base includes a mesh having a plurality of fluid passages.

7. The hatch cover assembly of claim 4, wherein the second annular rib is separated from the first annular rib by a first annular space, wherein the third annular rib is separated from the second annular rib by a second annular space, wherein the outer annular rim is separated from the third annular rib by a third annular space, and wherein the sealing wedge comprises:
   an arcuate inner wall that downwardly and outwardly curves from the lower surface of the gasket between the first annular rib and the second annular rib;
   an arcuate outer wall that connects to the inner wall at an annular apex that forms the annular lower pointed edge, wherein the arcuate outer wall also extends from the lower surface of the gasket underneath the second annular rib, and wherein the annular apex is underneath the first annular space; and
   an interior divot extending into an upper surface of the gasket above the apex.

8. The hatch cover assembly of claim 1, wherein the sealing wedge comprises:
   an arcuate inner wall that downwardly and outwardly curves from the lower surface; and
   an arcuate outer wall that connects to the inner wall at an annular apex that forms the annular pointed lower edge.

9. The hatch cover assembly of claim 8, wherein the sealing wedge further comprises an interior divot formed into an upper surface of the gasket above the apex.

10. The hatch cover assembly of claim 1, wherein the sealing wedge sealingly is configured to engage an interior surface of the lip of the hatch ring.

11. The hatch cover assembly of claim 10, wherein the sealing wedge is configured to sealingly engage a top surface of the lip of the hatch ring.

12. A sealing method for a hatch cover assembly, the sealing method comprising:
   forming a sealing wedge to extend downwardly from a lower surface of a gasket, wherein the sealing wedge includes an annular pointed lower edge;
   retaining one or more upwardly-extending annular ribs of the gasket within one or more channels of a gasket retainer; and
   sealingly engaging a lip of a hatch ring of the hatch cover assembly with the sealing wedge.

13. The sealing method of claim 12, wherein said forming comprises:
   providing an arcuate inner wall that downwardly and outwardly curves from the lower surface; and
   connecting an arcuate outer wall to the inner wall at an annular apex that forms the annular power pointed edge.

14. The sealing method of claim 13, wherein said forming further comprises forming an interior divot into an upper surface of the gasket above the apex.

15. The sealing method of claim 12, wherein said sealingly engaging comprises sealingly engaging an interior surface of the lip of the hatch ring.

16. The sealing method of claim 15, wherein said sealingly engaging further comprises sealingly engaging a top surface of the lip of the hatch ring.

17. A rail car comprising:
   one or more truck assemblies including wheel sets that are configured to be rotatably supported on rails;
   a car body supported by the one or more truck assemblies, wherein the car body includes at least one compartment;
   a hatch cover assembly mounted on the car body, wherein the hatch cover assembly comprises:
      a gasket retainer having one or more channels;
      a gasket including:
         a sealing wedge extending downwardly from a lower surface of the gasket, wherein the sealing wedge includes an annular pointed lower edge, and wherein the sealing wedge is configured to sealingly engage a lip of a hatch ring; and one or more upwardly-extending annular ribs retained within the one or more channels of the gasket retainer.

18. The rail car of claim 17, wherein the hatch cover assembly further comprises a cover having a hinge and a latch.

19. The rail car of claim 17, wherein the one or more upwardly-extending annular ribs comprises a first annular rib extending upwardly from an upper surface of a main body around a central base, wherein the first annular rib is retained within an inboard channel of the gasket retainer, wherein the gasket further comprises:

a second annular rib outboard from the first annular rib, wherein the second annular rib abuts into a lower surface of the gasket retainer;

a third annular rib outboard from the second annular rib; and an outer annular rim outboard from the third annular rib, wherein the outer annular rim is retained within an outboard channel of the gasket retainer.

20. The rail car of claim 17, wherein the sealing wedge comprises:

an arcuate inner wall that downwardly and outwardly curves from the lower surface;

an arcuate outer wall that connects to the inner wall at an annular apex that forms the annular lower pointed edge; and an interior divot formed into an upper surface of the gasket above the apex, wherein the sealing wedge sealingly engages an interior surface of the lip of the hatch ring, and wherein the sealing wedge sealingly engages a top surface of the lip of the hatch ring.

* * * * *